(12) United States Patent
Hausladen et al.

(10) Patent No.: US 10,746,320 B2
(45) Date of Patent: Aug. 18, 2020

(54) METHODS AND APPARATUS TO INSTALL VALVE PACKING COMPONENTS

(71) Applicant: Fisher Controls International LLC, Marshalltown, IA (US)

(72) Inventors: Kyle Anthony Hausladen, Marshalltown, IA (US); Bradley Steve Tibben, Nevada, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 77 days.

(21) Appl. No.: 15/808,530

(22) Filed: Nov. 9, 2017

(65) Prior Publication Data

US 2019/0137002 A1 May 9, 2019

(51) Int. Cl.
| | |
|---|---|
| *F16K 41/04* | (2006.01) |
| *F16J 15/20* | (2006.01) |
| *F16L 23/18* | (2006.01) |
| *F16J 15/18* | (2006.01) |
| *F16K 41/02* | (2006.01) |
| *B25B 27/24* | (2006.01) |

(52) U.S. Cl.
CPC .............. *F16K 41/04* (2013.01); *B25B 27/24* (2013.01); *F16J 15/184* (2013.01); *F16J 15/189* (2013.01); *F16J 15/20* (2013.01); *F16K 41/026* (2013.01); *F16L 23/18* (2013.01)

(58) Field of Classification Search
CPC .... F16J 15/16; F16J 15/18; F16J 15/20; F16L 23/18; F16K 5/0257; F16K 5/0271; F16K 41/04

USPC .......... 29/255, 278, 271; 277/511; 81/124.1
See application file for complete search history.

(56) References Cited

U.S. PATENT DOCUMENTS

| | | | |
|---|---|---|---|
| 1,956,843 A | 5/1934 | Wheeler | |
| 3,635,256 A * | 1/1972 | McLarty | ................. F16L 9/133 138/144 |
| 4,306,728 A * | 12/1981 | Huperz | ................. F16J 15/186 277/536 |
| 4,512,586 A | 4/1985 | Smith | |
| 4,766,755 A | 8/1988 | Allen | |

(Continued)

FOREIGN PATENT DOCUMENTS

| | | |
|---|---|---|
| EP | 0263042 | 4/1998 |
| JP | 2002355771 | 12/2002 |
| WO | 9907513 | 2/1999 |

OTHER PUBLICATIONS

International Searching Authority, "Written Opinion", issued in connection with International Application No. PCT/US2018/056417 dated Jan. 30, 2019, 7 pages.

(Continued)

*Primary Examiner* — Mary E McManmon
*Assistant Examiner* — Kevin R Barss
(74) *Attorney, Agent, or Firm* — Hanley, Flight & Zimmerman, LLC

(57) ABSTRACT

Valve packing installation apparatus and related methods for use with fluid valves are disclosed. An apparatus includes a tube to receive a stack of packing components. The tube has a first end and a second end. A plunger is disposed within the tube adjacent the second end. The plunger is slidable toward the first end to expel the stack of packing components into a valve in a predetermined order associated with an installation sequence.

17 Claims, 5 Drawing Sheets

(56) References Cited

U.S. PATENT DOCUMENTS

| | | | | |
|---|---|---|---|---|
| 4,886,241 A | * | 12/1989 | Davis | F16J 15/166 |
| | | | | 251/214 |
| 5,024,453 A | | 6/1991 | Suggs | |
| 6,027,098 A | * | 2/2000 | Nevrekar | F16K 3/04 |
| | | | | 251/164 |
| 8,281,797 B2 | | 10/2012 | Brestel | |

OTHER PUBLICATIONS

International Searching Authority, "International Search Report", issued in connection with International Application No. PCT/US2018/056417 dated Jan. 30, 2019, 6 pages.

\* cited by examiner

US 10,746,320 B2

METHODS AND APPARATUS TO INSTALL VALVE PACKING COMPONENTS

FIELD OF THE DISCLOSURE

This disclosure relates generally to fluid valves and, more particularly, to methods and apparatus to install valve packing components.

BACKGROUND

Process control systems employ fluid control valves to regulate process fluids, such as water, natural gas, oil, etc. A fluid valve typically controls flow of a process fluid by moving (e.g., via an actuator) a valve plug or other fluid flow control member. For example, a sliding stem fluid valve may be coupled to an actuator (e.g. a pneumatic actuator) to cause a valve stem to move in and out of a valve bonnet, thereby causing a valve plug positioned within the fluid valve to increase and/or decrease a flow of the fluid through the valve. To avoid leaks and/or undesired changes in fluid pressure that may be caused by moving valve components (e.g., a valve stem), fluid control valves (e.g., a sliding stem fluid valve, a rotary fluid valve, etc.) are typically implemented with a valve packing. A valve packing is typically implemented as a stack or stacks of packing rings that surround a valve stem within a valve bonnet. The packing rings are compressed by a packing nut to form a seal that prevents a fluid from leaking past a valve stem or shaft. In addition to the stack or stacks of packing rings, the packing may include other packing components such as a packing follower, lantern rings, springs, wipers, v-rings, and/or other packing components to form a proper seal.

SUMMARY

An apparatus disclosed herein includes a tube to receive a stack of packing components. The tube has a first and a second end. A plunger is disposed within the tube adjacent the second end. The plunger is slidable toward the first end to expel the packing components into a valve in a predetermined order associated with an installation sequence.

A method disclosed herein includes removing a cap from a first end of a tube, aligning the tube with a bonnet of a valve, sliding a plunger disposed within the tube adjacent a second end of the tube toward the first end of the tube, and expelling a stack of packing components into a valve in a predetermined order associated with an installation process. The stack of packing components is initially disposed proximate the first end of the tube.

Another apparatus disclosed herein includes a stack of packing components to be installed in a valve, the stack of packing components being in a predetermined order. The apparatus also includes a means for aligning the stack of packing components prior to installation in the valve. The apparatus also includes a means for expelling the stack of packing components from the means for aligning into the valve.

Figure 1:
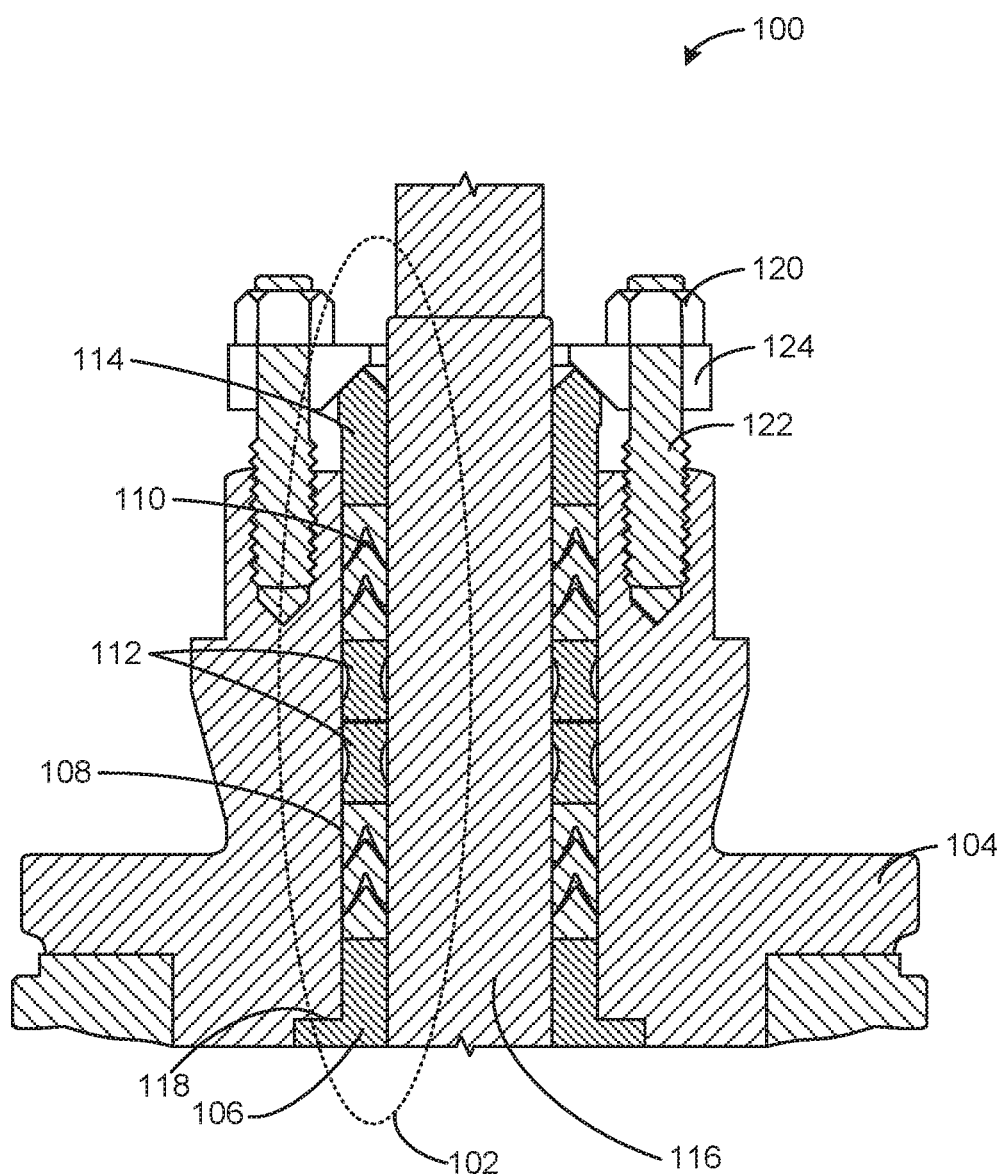
FIG. 1 is a cross-sectional view of an example valve and shows an example stack of packing components installed within the valve.

The figures are not to scale. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers). As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Fluid control valves may be implemented with valve packing materials that are energized and/or compressed to reduce leaks and/or changes in fluid pressure during normal valve use. For example, a sliding stem fluid valve typically has valve packing ring set(s) (e.g. a polytetrafluoroethylene (PTFE) or low friction graphite material) positioned in a bonnet surrounding a valve stem. Other valve packing components (e.g. lantern rings, springs, v-rings, etc.) may also be implemented along with the packing ring set(s). A known packing follower (sometimes referred to as a gland follower) may be positioned between the valve packing and a packing flange adjustably coupled to the bonnet via fasteners (e.g. one or more packing studs and/or nuts). In particular, to increase or decrease a load provided to the valve packing, the packing flange is adjusted via the fasteners positioned on opposite sides of the packing flange, thereby enabling the packing flange to move toward or away from the bonnet to compress or decompress the packing follower and the valve packing ring set(s).

Traditionally, a valve packing (also referred to herein as packing) has been inserted into a valve bonnet either during the initial manufacturing of the valve or for valve servicing purposes (i.e. replacing the valve packing component(s)), by removing packing nuts and/or studs, removing a packing flange, removing old or damaged packing and/or packing components, cleaning and lubricating the valve stem (e.g. by hand using a cloth), inserting the new packing and/or packing components (e.g. springs, lantern rings, a packing follower, etc.), fitting the packing flange over the packing follower with fasteners (e.g. packing studs and nuts), and adjusting or tightening the packing nuts to compress the packing. A valve packing and/or packing components may need to be replaced due to damage and/or leaks, especially as the packing deteriorates over time.

However, packing installation errors may occur with the traditional packing installation method. For example, when a service person receives packing components, the packing components (e.g. springs, lantern rings, packing rings, packing followers, etc.) are typically packaged separately. It is then possible for the service person to insert the packing components in the incorrect order and/or insert individual packing components backwards, resulting in an improper seal and/or damaging the valve. Additionally, the packing components may be damaged by a person installing the packing components incorrectly. For example, if the packing components are not properly aligned with the valve stem, threading of the valve stem may damage the packing components.

Methods and apparatus to install packing components in a valve are disclosed herein. Examples disclosed herein reduce and/or prevent improper installation of packing components, damage to valves, and/or damage to packing components. In examples disclosed herein, a stack of packing components is disposed at a first end of a tube. A plunger is disposed within a second end of the tube, and is slidable toward the first end to expel the stack of packing components into a valve in a predetermined order associated with an installation sequence. By disposing the stack of packing components within the tube in a predetermined order, the end user may easily install the stack of packing components in the correct order without causing damage to either the valve or the packing components. Additionally, the correct installation of the stack of packing components reduces or eliminates the risk of process fluid leaks. In some disclosed examples, the tube is sealed to hold a vacuum. In some disclosed examples, the stack of packing components includes at least a packing ring, a lantern ring, or a packing follower. In some disclosed examples, the packing ring includes a self-lubricating material. In some disclosed examples, the tube includes a self-lubricating material. In some disclosed examples, the apparatus includes a cap secured to the first end of the tube prior to installation. In some disclosed examples, the first end of the tube has a taper to match a taper of a bonnet of the valve. In some disclosed examples, the valve to receive the stack of packing components is a sliding stem valve. In some disclosed examples, the valve to receive the stack of packing components is a rotary valve.

In some disclosed examples, a cap is removed from a first end of a tube. In such disclosed examples, the tube is aligned with a bonnet of a valve. In such disclosed examples, sliding a plunger disposed within the tube adjacent a second end of the tube toward the first end of the tube is performed to expel a stack of packing components into the valve. In such disclosed examples, the stack of packing components is initially disposed proximate the first end of the tube in a predetermined order associated with an installation process.

In some disclosed examples, a stack of packing components is to be installed in a valve. In such disclosed examples, the stack of packing components is in a predetermined order. Such disclosed examples include a means for aligning the stack of packing components prior to installation in the valve. Such disclosed examples include a means for expelling the stack of packing components from the means for aligning into the valve. In some disclosed examples, the means for aligning includes an inner circumferential surface to surround the stack of packing components. In some disclosed examples, the means for expelling includes a rod having an outer circumferential surface that corresponds to the inner surface.

As will be discussed in greater detail below, the disclosed valve packing installation apparatus may have various configurations, sizes, and/or orientations. In examples disclosed herein, such configurations, sizes, and/or orientations may be altered or changed to optimize at least one of the packaging and manufacturing of the valve packing installation apparatus and/or the effectiveness of the valve packing components (e.g. different applications may require different packing components). In some disclosed examples, the teachings of this disclosure are implemented on a sliding stem valve. Alternatively, in other examples, the teachings of this disclosure may be implemented on rotary valves and/or any other types of valves.

FIG. 1 is a cross-sectional view of an example fluid valve 100 and shows an example stack of packing components 102 installed within the fluid valve 100. In the example of FIG. 1, the fluid valve 100 is a sliding stem fluid valve. While the example stack of packing components 102 of FIG. 1 is implemented in the sliding stem fluid valve 100, in other examples, the stack of packing components 102 may be implemented in any other valve (e.g. a rotary valve).

In the illustrated example, the stack of packing components 102 is disposed within a bonnet 104 of the fluid valve 100. The stack of packing components 102 of the illustrated example includes a packing box ring 106, a lower set of packing rings 108, an upper set of packing rings 110, lantern rings 112, and a packing follower 114. Alternatively, the example stack of packing components 102 may include various other or additional packing components, such as springs, wipers, male and/or female adapters, v-rings, etc. In the illustrated example, each component of the stack of packing components 102 is disposed within the bonnet 104 and surrounds a valve stem 116 extending through the bonnet 104. In the illustrated example, the valve stem 116 is not threaded, but in alternative examples, the valve stem 116 may be threaded. In further alternative examples, the valve stem 116 may be lubricated prior to installation of the stack of packing components 102. For example, a valve stem made of a metallic material may require lubrication to enable the stack of packing components 102 to slide into the correct position within the bonnet 104.

In the illustrated example, the packing box ring 106 is disposed within the bonnet 104 and held in place by a shoulder 118 of the bonnet. In the illustrated example, the lower set of packing rings 108 is interposed between the packing box ring 106 and the lantern rings 112. The lower set of packing rings 108 of the illustrated example may be a compressible material such as graphite, graphite composite, PTFE, etc. In the illustrated example, the lantern rings 112 are interposed between the upper and lower sets of packing rings 108 and 110. The lantern rings 112 may provide multiple functions for the packing ring sets 108 and 110, such as maintaining the packing ring sets 108 and 110 lubricated, cool, and free from abrasives and/or chemicals. The lantern rings 112 of the illustrated example may include holes to perform these functions and may be made of different materials dependent on the application (e.g. PTFE, metallic materials, etc.). In the illustrated example, the upper packing ring set 110 is interposed between the lantern rings 112 and the packing follower 114. The upper packing ring set 110 may have the same properties and/or configurations as the lower packing ring set 108, or may have any other properties and/or configurations disclosed herein. In the illustrated example, the packing follower 114 is positioned on the upper packing ring set 110.

In the illustrated example, the stack of packing components 102 includes two sets of packing rings, the lower packing ring set 108 and the upper packing ring set 110 (referred to together as packing ring sets 108 and 110). In the illustrated example, the lower packing ring set 108 and the upper packing ring set 110 include the same number of packing rings. Alternatively, in other examples, the upper packing ring set 110 may contain greater or fewer numbers of packing rings than the lower packing ring set 108. Further still, in other examples, the stack of packing components 102 may include a single set of packing rings 108 or 110, where the single set of packing rings 108 or 110 is supported by alternative packing components such as springs and/or additional lantern rings. In the alternative example stack of packing components 102 including a single set of packing rings 108 or 110, the packing ring set 108 or 110 is typically located above the spring and/or additional lantern rings.

In the illustrated example, the valve 100 includes packing nuts 120 (also referred to as gland nuts). In the illustrated example, the packing nuts 120 are threaded and may be threadably coupled to packing studs 122. Additionally, the packing studs 122 of the illustrated example may slide through openings or slots in a packing flange 124 (also referred to as a gland flange). In the illustrated example, the packing flange 124 is disposed on the packing follower 114. In the illustrated example, the packing studs 122 are threadably coupled to threaded holes within the bonnet 104.

The packing nuts 120 of the illustrated example may be adjusted (e.g. using a wrench) to raise or lower the packing flange 124, effectively increasing or decreasing a load applied to the packing ring sets 108 and 110. In one example, the packing nuts 120 are tightened (i.e. the packing flange 124 is moved toward the bonnet 104) and the load is transferred through the packing follower 114 to compress the packing ring sets 108 and 110. Alternatively, the packing nuts 120 may be loosened (i.e. the packing flange 124 is moved away from the bonnet 104) and the load transferred through the packing follower 114 to the packing ring sets 108 and 110 is reduced, decompressing the packing ring sets 108 and 110. The desired amount of compression of the packing ring sets 108 and 110 creates a desired seal in the fluid valve 100. In other examples, the stack of packing components 102 may have any other configurations disclosed herein.

In alternative examples, the packing follower 114 is removably coupled to the bonnet 104 of the fluid valve 100, for example, via threads. In such alternative examples, no packing flange (e.g. the packing flange 124 of FIG. 1) is used. In such alternative examples, the packing follower 114 may be adjusted (e.g. via rotating relative to the bonnet 104) to move toward and/or away from the bonnet 104. Further, in such alternative examples, the packing follower 114 applies a load to the packing ring sets 108 and 110 when adjusted. Increasing or decreasing the compression of the packing ring sets 108 and 110 creates a seal in the fluid valve 100. In other alternative examples, the packing follower 114 may be accompanied by a spring interposed between the packing follower 114 and the upper packing ring set 110. The spring generates a load (e.g., in response to being compressed by the packing follower 114) and transmits the load to the packing ring sets 108 and 110, which enables the packing ring sets 108 and 110 to effectively seal the fluid valve 100. In yet other alternative examples, the stack of packing components 102 includes any other configurations disclosed herein.

To effectively seal the fluid valve 100 and/or utilize the useful life of the stack of packing components 102, the load transmitted to the packing ring sets 108 and 110 by the packing follower 114 must be applied uniformly. In some examples, a spring accompanies the packing follower 114 to ensure the load applied to the packing ring sets 108 and 110 is uniform.

Figure 2:
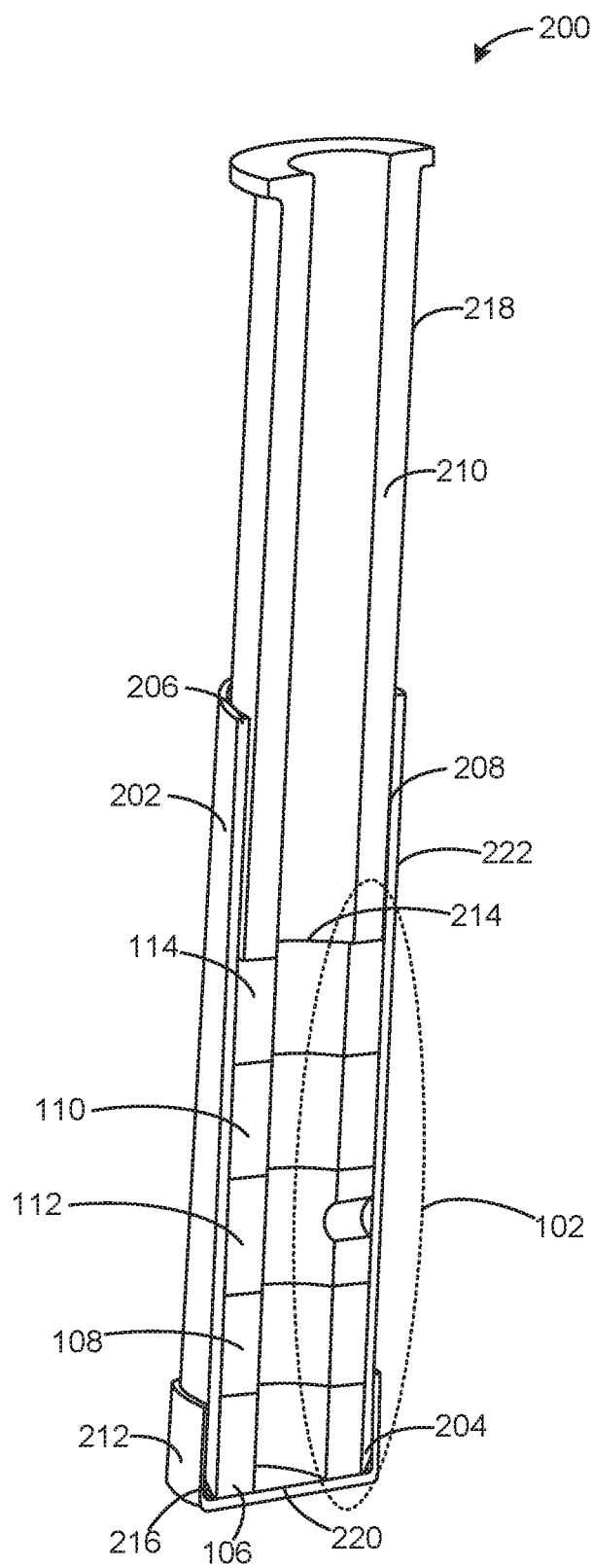
FIG. 2 is a cross-sectional view of an example valve packing installation apparatus.

FIG. 2 is a cross-sectional view of an example valve packing installation apparatus 200. The example valve packing installation apparatus 200 includes the example stack of packing components 102 of FIG. 1 to be installed in a valve, such as the example valve 100 of FIG. 1. The stack of packing components 102 of the illustrated example may include, among others, any example configurations previously disclosed.

To prepare the example valve packing installation apparatus 200 to deliver the stack of packing components 102 to the valve 100, means for aligning the stack of packing components 102 prior to installation surrounds the stack of packing components 102. In some examples, the means for aligning the stack of packing components 102 includes a tube 202, as shown in FIG. 2. While the example of FIG. 2 depicts the tube 202, the means for aligning may include one or more different tubes and/or, more generally, one or more elements including an inner and outer surface (e.g. inner and outer circumferential surfaces). In the illustrated example, the tube 202 includes a first end 204 and a second end 206. In the illustrated example, the stack of packing components 102 is disposed at the first end 204. The stack of packing components 102 of the illustrated example is in contact with the inner surface 208 of the tube 202.

To install the stack of packing components 102 into the example valve 100, means for expelling the stack of packing components 102 from the valve packing installation apparatus 200 is disposed within the means for aligning. In some examples, the means for expelling includes a plunger 210, as shown in FIG. 2. In other examples, the means for expelling includes one or more different plungers, rods, pistons, and/or, more generally, one or more elements including a surface (e.g. a circumferential surface) corresponding to the inner surface of the means for aligning. The plunger 210 of the illustrated example is disposed at the second end 206. The illustrated example includes a cap 212 disposed at the first end 204. The plunger 210 is also positioned on the packing follower 114 of the stack of packing components 102 at an interface 214.

The tube 202 of the illustrated example includes a taper 216 located at the first end 204. In some examples, the taper 216 is designed to match a taper of the bonnet 104 of a given valve, such as the example valve 100 of FIG. 1. The taper 216 enables the example valve packing installation apparatus 200 to align with the example valve stem 116 of FIG. 1. Alignment of the tube 202 of the illustrated example prevents and/or reduces damage to the stack of packing components 102 during installation.

The tube 202 of the illustrated example may be made of a plastic material. In such examples, the plastic material may be a self-lubricating plastic (e.g. a PTFE such as Teflon™). Alternatively, in other examples, the tube 202 may be made of a metallic material. For example, a metallic tube may be used for applications necessitating the tube be reused before disposal. In yet other examples, the tube 202 may be lubricated. For example, certain applications may require a metallic tube 202 be lubricated (e.g. using grease) to enable the stack of packing components 102 to slide out of the tube 202.

The plunger 210 of the illustrated example has an outer surface 218 that corresponds to and slidably engages the inner surface 208 of the tube 202, and the plunger 210 may slide within the tube 202. Sliding the plunger 210 from the second end 206 toward the first end 204 may expel the stack of packing components 102 when the cap 212 is removed. In the illustrated example, the plunger 210 may be made of a plastic material. In such examples, the plastic material may be a self-lubricating material (e.g. a PTFE such as Teflon™). Alternatively, in other examples, the plunger 210 may be made of a metallic material. In yet another example, a lubricant (e.g. grease) may be applied to the plunger 210 to enable it to slide within the tube 202, thus propelling the stack of packing components 102 into the correct position within the bonnet 104.

The cap 212 of the illustrated example is disposed at the first end 204 prior to installation of the stack of packing components 102. In the illustrated example, the cap 212 has an inner surface 220 that corresponds to an outer surface 222 of the tube. The cap 212 of the illustrated example prevents the stack of packing components 102 from sliding out of the tube 202 until the cap 212 is removed. In some examples, the cap 212 may be removed by hand. Further, in some examples, the cap 212 prevents unwanted particulates (e.g. abrasives, chemicals, etc.) from entering the valve packing installation apparatus 200 and damaging components. For example, the cap 212 may seal the tube 202 to hold a vacuum. In some examples, the cap 212 of the illustrated example may be made of a plastic material (e.g. a PTFE such as Teflon™). In some other examples, the cap 212 may be made of a metallic material.

The valve packing installation apparatus 200 of the illustrated example may be used for any valve size. The components included within the valve packing installation apparatus 200 may be altered to accommodate a multitude of different valve sizes. Any configurations disclosed herein may be used, regardless of the size of a valve.

Figure 3A:
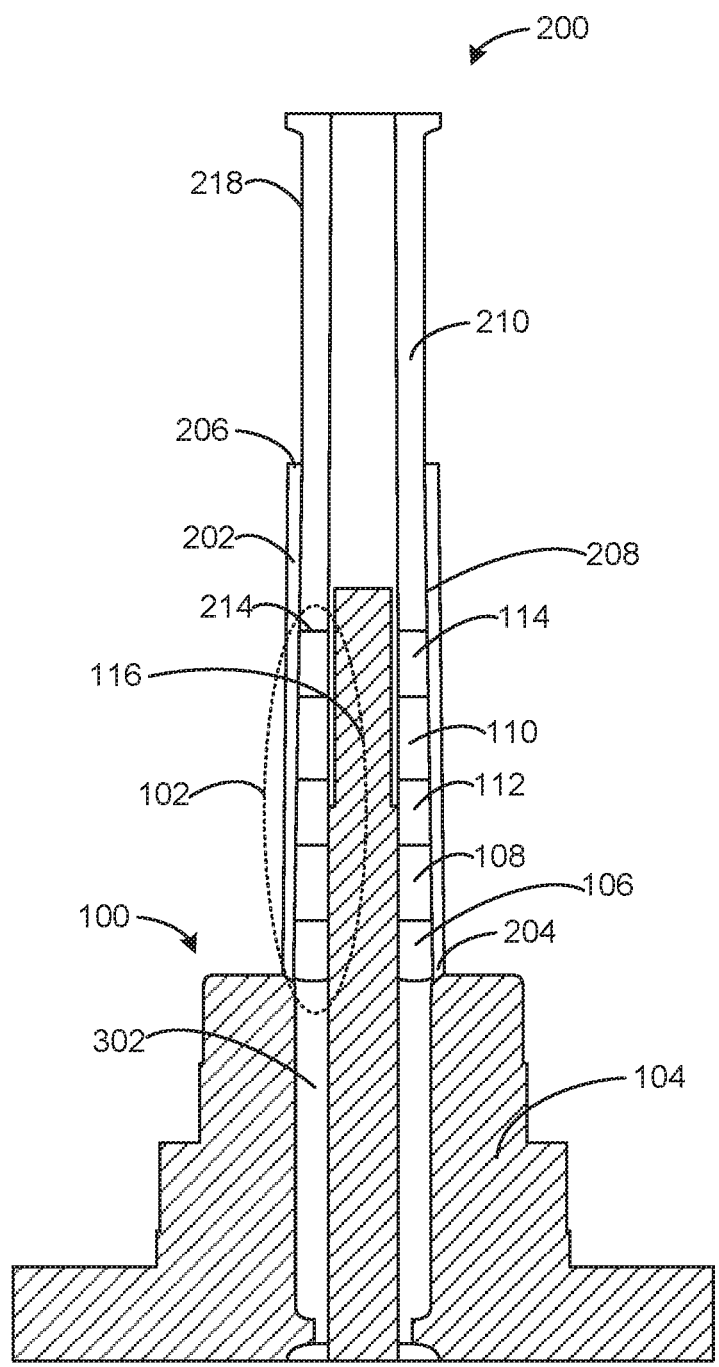
FIG. 3A is a cross-sectional view of the example valve packing installation apparatus of FIG. 2 in position to install the stack of packing components in a valve.

In example FIG. 3A, the example valve packing installation apparatus 200 is in position to install the stack of packing components 102 into the example valve 100. In the illustrated example, the valve packing installation apparatus 200 is disposed on the valve bonnet 104 and surrounds the valve stem 116. The stack of packing components 102 of the illustrated example is disposed above a packing gland 302. The packing gland 302 of the illustrated example houses the stack of packing components 102 after installation.

In the illustrated example, the taper 216 corresponds to a taper of the bonnet 104. The taper 216 aligns the tube 202 with the valve 100. The stack of packing components 102 is therefore aligned with the packing gland 302. Additionally, the valve stem 116 of the illustrated example aids the alignment of the stack of packing components 102 with the packing gland 302. Once the stack of packing components 102 is correctly aligned with the packing gland 302, the plunger 210 may slide toward the first end 204, transmitting a force at the interface 214. The force transmitted by the plunger 210 is initially generated by applying a force on the plunger 210 in the direction of the stack of packing components 102. The force applied by plunger 210 expels the stack of packing components 102 into the packing gland 302.

The stack of packing components 102 of the illustrated example includes the example packing components of FIG. 1: the packing box ring 106, the lantern rings 112, the packing ring sets 108 and 110, and the packing follower 114. However, the stack of packing components 102 of the illustrated example may be any other suitable configuration, including those described herein. The stack of packing components 102 is configured in a predetermined arrangement (i.e. the designated arrangement of the components for a given application) prior to installation. The predetermined arrangement is dependent on the application and/or the surrounding environment of the valve 100 for which the example valve packing installation apparatus 200 is to be implemented.

Figure 3B:
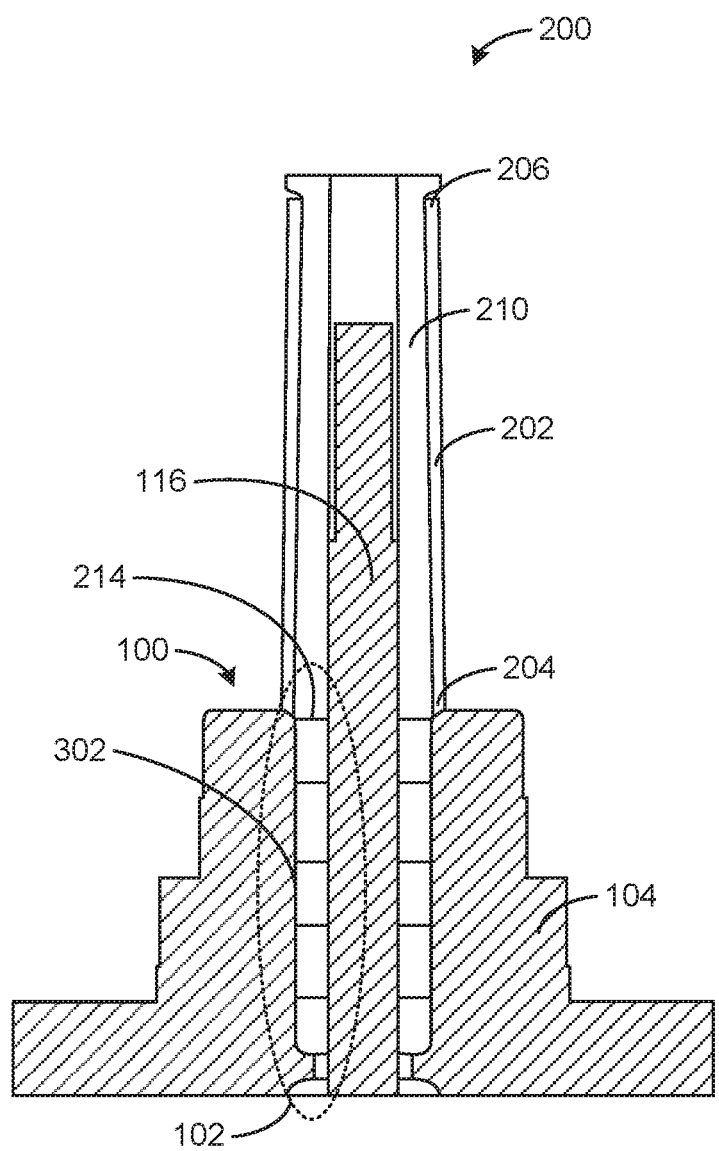
FIG. 3B is a cross-sectional view of the example valve packing installation apparatus of FIG. 2 having installed the stack of packing components in a valve.

In example FIG. 3B, the example valve packing installation apparatus 200 has installed the stack of packing components 102 in the packing gland 302 of the valve 100. In the illustrated example, the valve packing installation apparatus 200 is disposed on the valve bonnet 104 and surrounds the valve stem 116. In the illustrated example, the plunger 210 is disposed in the tube 202, and the interface 214 between the plunger 210 and the stack of packing components 102 is adjacent the first end 204. When the interface 214 is adjacent the first end 204, the stack of packing components 102 has been expelled from the tube 202 and entered the bonnet 104. After the stack of packing components 102 has been delivered to the bonnet 104, the valve packing installation apparatus 200 may be removed from its position on the bonnet 104.

Once the stack of packing components 102 has been installed, the packing ring sets 108 and 110 of the illustrated example may be compressed using any methods previously disclosed. In some examples, the example packing flange 124 of FIG. 1 may be positioned on the example packing follower 114 of FIG. 1. In such examples, the packing flange 124 is fastened to the bonnet 104 of the illustrated example via the example packing nuts 120 and example packing studs 122 of FIG. 1. In such examples, the packing ring sets 108 and 110 of FIG. 1 are compressed or decompressed as previously disclosed. In other examples, the packing follower 114 may be removably coupled to the bonnet 104. In such other examples, the packing ring sets 108 and 110 of FIG. 1 are compressed or decompressed by adjusting the packing follower as previously disclosed.

Figure 4:
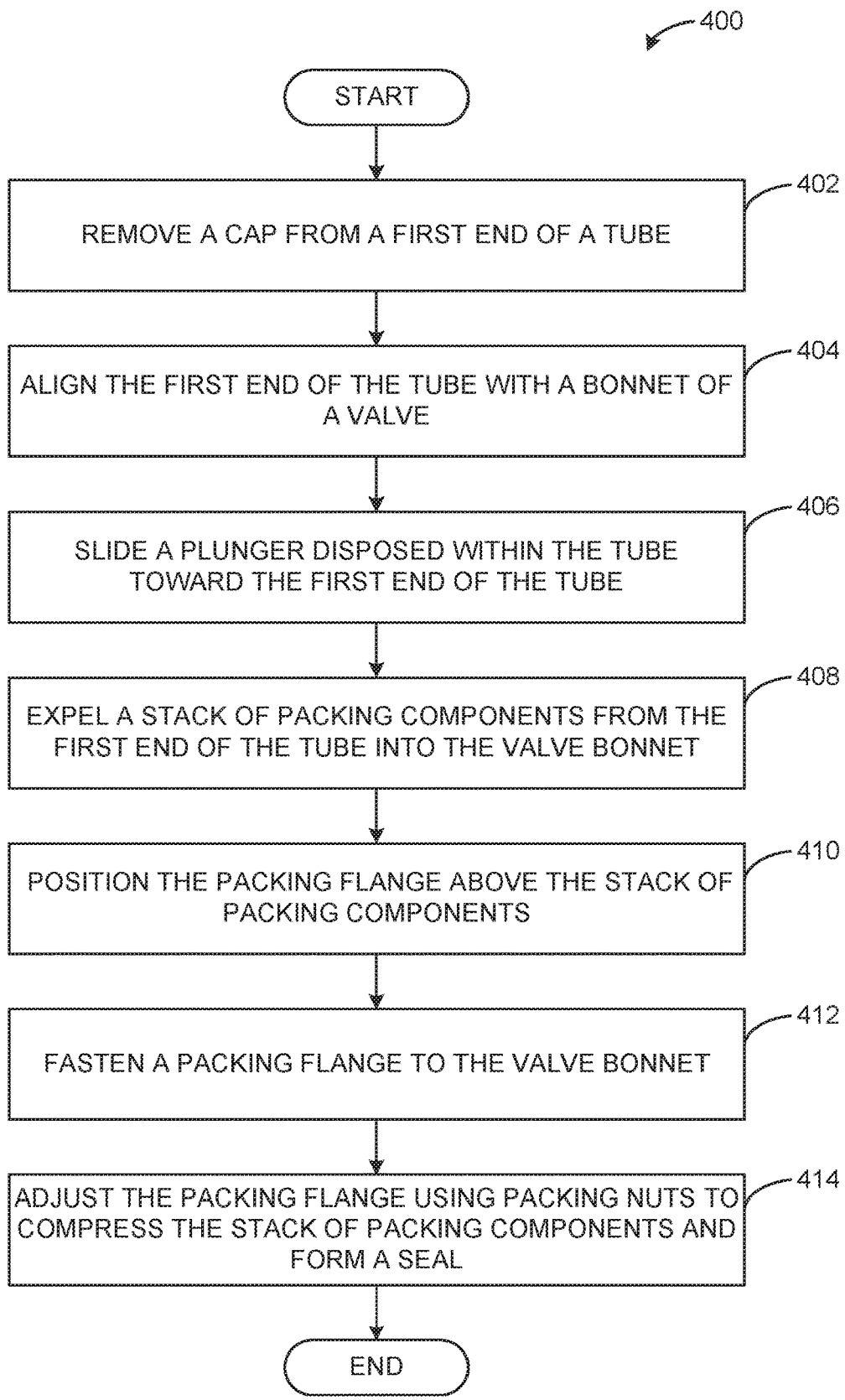
FIG. 4 is a flow diagram of an example method that can be used to implement the example valve packing installation apparatus of FIG. 2.

FIG. 4 is a flow diagram of an example method 400 that can be used to implement the example valve packing installation apparatus 200 of FIGS. 1-3B. The example method may be implemented to install the example stack of packing components 102 of FIGS. 2-3B without damaging the stack of packing components 102 and/or the example valve 100 of FIG. 1. Additionally, the example method may prevent or reduce the risk of process fluid leaks in the valve 100. As previously mentioned, the damage or leaks may be caused by installing the stack of packing components 102 incorrectly (e.g. one or more components installed backwards, misalignment of the packing components, etc.).

The example method 400 begins by removing a cap from a first end of a tube (block 402). In some examples, the example cap 212 of FIG. 2 is positioned at the example first end 204 of FIG. 2. In such examples, the cap 212 functions to prevent the stack of packing components 102 from being expelled from the valve packing installation apparatus 200 prior to the intended installation. Further, in such examples, the cap 212 may prevent unwanted particulates (e.g. abrasives, chemicals, etc.) from entering the valve packing installation apparatus 200 and damaging components by, for example, sealing the example tube 202 of FIGS. 2-3B to hold a vacuum. In some examples, the cap 212 may be removed by hand.

The example method 400 includes aligning the first end with a bonnet of a valve (block 404). In some examples, the first end 204 is aligned with the example bonnet 104 of FIGS. 1-3B. In some examples, the first end 204 includes the taper 216 of FIGS. 2-3B. In such examples, the taper 216 aligns the tube 202 with the valve 100. In such examples, the stack of packing components 102 surrounds the example valve stem 116. The alignment of the stack of packing components 102 with the example packing gland 302 of FIGS. 3A-3B may thus be facilitated by aligning the tube 202 with the bonnet 104 (e.g. using the taper 216) and the valve stem 116.

The example method 400 includes sliding a plunger disposed within the tube toward the first end (block 406). In some examples, the example plunger 210 of FIGS. 2-3B is positioned within the tube 202, initially disposed at the second end 206 of FIGS. 2-3B. In such examples, the plunger 210 is in contact with the stack of packing components 102 at the example interface 214 of FIGS. 2-3B. In such examples, the plunger 210 may slide from the second end 206 toward the first end 204.

The example method 400 includes expelling a stack of packing components from the first end into the valve bonnet (block 408). In some examples, the stack of packing components 102 is expelled from the first end 204. In such examples, the plunger 210 transmits a force to the stack of packing components 102 at the interface 214 as it slides toward the first end 204. In such examples, the force transmitted by the plunger 210 is initially generated by applying a force on the plunger 210 in the direction of the stack of packing components 102. In such examples, the force exerted at the interface 214 expels the stack of packing components 102 from the tube 202 and into the packing gland 302.

The example method 400 includes positioning the packing flange above the stack of packing components (block 410). In some examples, the example packing flange 124 of FIG. 1 may be positioned above the stack of packing components 102. In such examples, packing flange 124 is positioned in contact with the example packing follower 114 of FIG. 1.

The example method 400 includes fastening a packing flange to the valve bonnet (block 412). In some examples, the packing flange 124 is fastened to the bonnet 104. In such examples, the example packing nuts 120 and example packing studs 122 of FIG. 1 fasten the packing flange 124 to the bonnet 104. Further, in such examples, the packing studs 122 may be threadably coupled to threaded holes in the bonnet 104. The packing nuts 120 may be threadably coupled to the packing studs 122 and positioned above the packing flange 124.

The example method 400 includes adjusting the packing flange using packing nuts to compress the stack of packing components and form a seal (block 414). In some examples, the packing nuts 120 used to fasten the packing flange 124 to the valve bonnet 104 may be adjusted (e.g. using a wrench) to raise or lower the packing flange 124 (i.e. move the packing flange 124 toward or away from the bonnet 104). In such examples, the packing flange 124 is in contact with the packing follower 114. Further, in such examples, the packing flange 124 exerts a force on the packing follower 114, and the packing follower 114 transmits that force to the example packing ring sets 108 and 110 of FIG. 1. The force ultimately exerted on the packing ring sets 108 and 110 compresses the packing ring sets 108 and 110 to prevent the fluid valve 100 from leaking process fluid(s) and/or undesired changes in fluid pressure.

In such examples, raising the packing flange 124 (i.e. moving the packing flange 124 away from the bonnet 104) decreases the force transmitted through the packing follower 114 to the packing ring sets 108 and 110. A reduction in the force transmitted to the packing ring sets 108 and 110 reduces the amount of compression. Alternatively, in other such examples, lowering the packing flange 124 (i.e. moving the packing flange 124 toward the bonnet 104) increases the force exerted on the packing follower 114 that is transmitted to the packing ring sets 108 and 110, resulting in increased compression. To optimize the effectiveness of the packing ring sets 108 and 110, the amount of compression must be adjusted until the packing ring sets are compressed to the desired degree.

Although the example valve packing installation apparatus 200 is described with reference to the flowchart illustrated in FIG. 4, any other method of implementing the valve packing installation apparatus may alternatively be used. For example, the order of execution of the blocks of FIG. 4 may be combined and/or some of the blocks described may be changed, eliminated, or additional blocks may be added. The example method 400 shown in FIG. 4 is only one example method describing the implementation of the valve packing installation apparatus 200.

As used herein, the terms "including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

From the foregoing, it will be appreciated that methods and apparatus to install valve packing components have been disclosed that reduce and/or prevent improper valve packing component installation (e.g., components installed in the incorrect order and/or backwards, misalignment of packing components, etc.) and/or damage to valves and/or valve packing components exhibited by known valve packing installation procedures. For example, improper installation of packing and/or packing components may be caused by user error(s) and/or misjudgment. Some examples enable a person to easily install a stack of packing components in a fluid valve. Further, some disclosed examples enable the person to properly align an example stack of packing components with a packing gland to ensure the stack of packing components is installed properly. Further still, some disclosed examples ensure that an example stack of packing components is configured within an example valve packing installation apparatus prior to installation to reduce or prevent the stack of packing components from being installed in an incorrect order. By enabling the person to align the previously configured stack of packing components with the packing gland, the installation of valve packing becomes more efficient, which increases the performance of the valve packing and/or reduces and/or prevents adverse effects (e.g., leaks in the fluid valve, undesired changes in pressure, and/or damage to valves and/or packing components) that would have otherwise been caused by using known valve packing installation procedures.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a tube to receive a stack of packing components, the tube having a first end and a second end, the tube sealed to hold a vacuum; and
   a plunger disposed within the tube adjacent the second end, the plunger slidable toward the first end to expel the stack of packing components into a valve in a predetermined order associated with an installation sequence.

2. The apparatus of claim 1, wherein the stack of packing components includes at least a packing ring, a lantern ring, or a packing follower.

3. The apparatus of claim 2, wherein the packing ring includes a self-lubricating material.

4. The apparatus of claim 1, wherein the tube includes a self-lubricating material.

5. The apparatus of claim 1, further including a cap secured at the first end of the tube prior to installation.

6. The apparatus of claim 1, wherein the first end of the tube has a taper to match a taper of a bonnet of the valve.

7. The apparatus of claim 1, wherein the valve to receive the stack of packing components is a sliding stem valve.

8. The apparatus of claim 1, wherein the valve to receive the stack of packing components is a rotary valve.

9. An apparatus comprising:
   means for aligning a stack of packing components prior to installation in a valve;
   means for securing the packing components within the means for aligning, wherein the means for securing seals the means for aligning to hold a vacuum; and
   means for expelling the stack of packing components from the means for aligning into the valve, the stack of packing components disposed in a predetermined order associated with an installation sequence.

10. The apparatus of claim 9, wherein the means for aligning includes an inner circumferential surface to surround the stack of packing components.

11. The apparatus of claim 10, wherein the means for expelling includes a rod having an outer circumferential surface that corresponds to the inner circumferential surface.

12. The apparatus of claim 5, wherein the cap includes an inner circumferential surface that corresponds to an outer circumferential surface of the tube.

13. The apparatus of claim 9, wherein the stack of packing components includes at least a packing ring, a lantern ring, or a packing follower.

14. The apparatus of claim 13, wherein the packing ring includes a self-lubricating material.

15. An apparatus comprising:
   means for aligning a stack of packing components prior to installation in a valve;
   means for securing the packing components within the means for aligning; and
   means for expelling the stack of packing components from the means for aligning into the valve, the stack of packing components disposed in a predetermined order associated with an installation sequence, wherein the means for aligning has a first end and a second end opposite the first end, the means for expelling disposed at the second end, the first end including a taper to match a taper of a bonnet of the valve.

16. The apparatus of claim 9, wherein the valve to receive the stack of packing components is a sliding stem valve.

17. The apparatus of claim 9, wherein the valve to receive the stack of packing components is a rotary valve.

* * * * *